Nov. 1, 1966        A. L. JERORE        3,282,484
CAR TOP CARRIER
Filed April 6, 1965
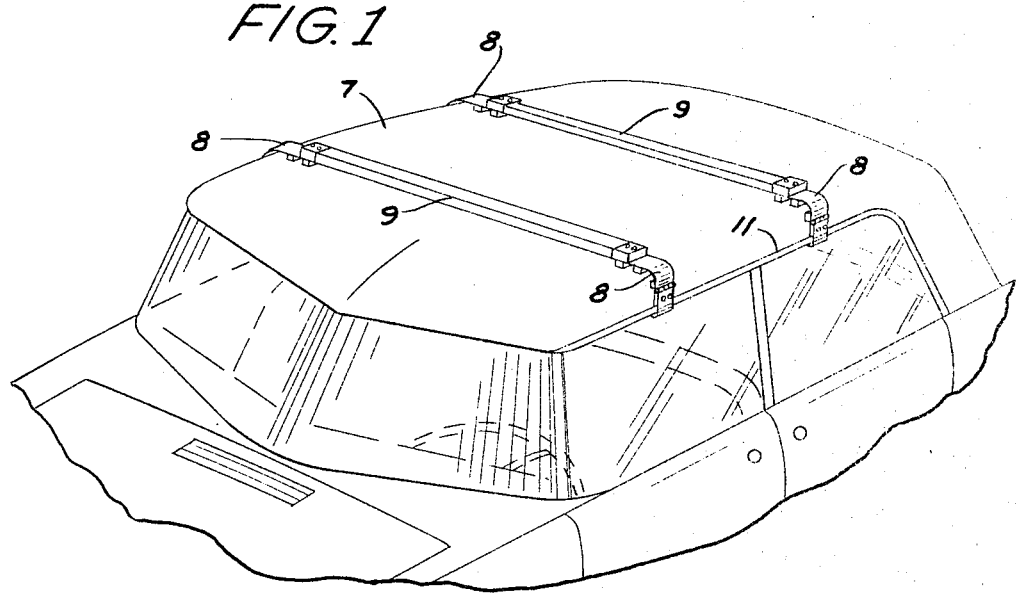
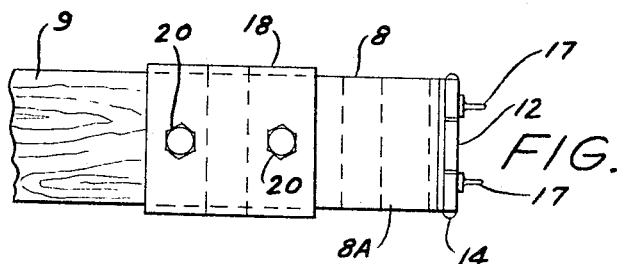
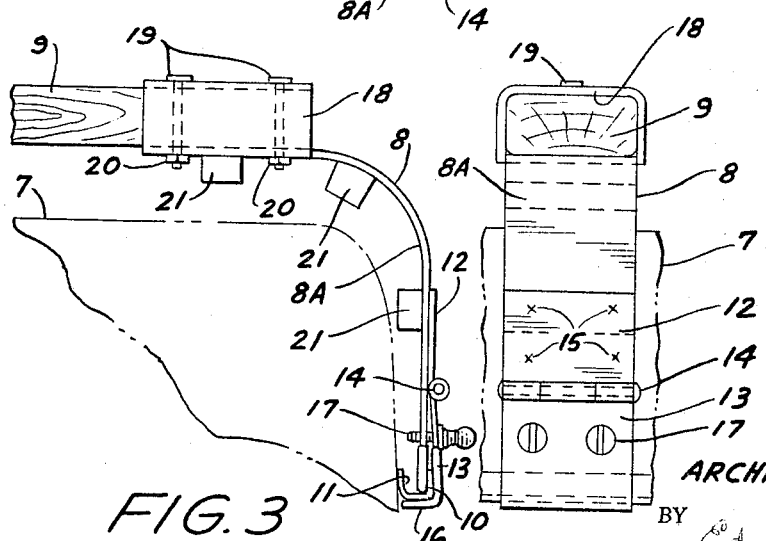
INVENTOR.
ARCHIE L. JERORE
BY
Edward M. Apple
ATTORNEYS

United States Patent Office 3,282,484
Patented Nov. 1, 1966

3,282,484
CAR TOP CARRIER
Archie L. Jerore, 17607 Huntington Road,
Detroit, Mich.
Filed Apr. 6, 1965, Ser. No. 445,995
3 Claims. (Cl. 224—42.1)

This invention relates to carriers for mounting on the top of the body of a motor vehicle, and has particular reference to that type of carrier which is intended to be attached to the rain gutter, or trough, formed along the sides of the car roof.

An object of the invention is to generally improve devices of the character indicated, and to provide a car top carrier, which is simple in construction, economical to manufacture, and efficient in operation.

Another object of the invention is to provide an improved support member for a car top carrier, which is constructed and arranged with a hinged member, a portion of which underlies the rain gutter, or trough, with adjustable means for securing the hinged portion to another element of the support member, whereby the device may be quickly and easily attached to the body of the vehicle, and may be detached therefrom with equal facility, and without the necessity of using special tools, and the like.

Another object of the invention is to provide a device of the character indicated in which the principal load carrying elements are supported directly by the rain gutter and in spaced relation to the vehicle roof.

Another object of the invention is to provide a support for a car top carrier, which is constructed and arranged so that the weight supported by the carrier does not directly rest on the thin metal comprising the vehicle roof, and is provided with resilient elements which are positioned between the load supporting elements of the carrier, and the roof, and which serve as a protection to the car roof in the event of an overload on the carrier.

Another object of the invention is to provide a car top carrier, which is constructed and arranged so that the weight of the load is distributed throughout a substantial area of the rain gutter, and is not directly carried by the comparatively thin metal, comprising the roof top of the vehicle, as is the case with many such devices now known to the public.

Another object of the invention is to provide an improved load carrying element for a car top carrier, which is constructed and arranged with a tubular terminal element at one end, which serves to receive the end of a cross bar comprising part of the car top carrier.

Another object of the invention is to provide a load carrying element for a car top carrier, which has a tunnel shaped element at one end for receiving one end of a bar, or rod, comprising part of the car top assembly, which rod, or bar, is initially adjustable in said tubular element so that the car top carrier may be adjusted, in width, to accommodate vehicle bodies of different size.

Another object of the invention is to provide a device of the character indicated, which is capable of supporting luggage, camping equipment, boats, ladders, and the like, on the top of a motor vehicle, and when not in use may be readily dismantled and stored in the trunk of the vehicle in a minimum of space.

The foregoing and other objects and advantages of the invention will become more apparent as the description proceeds, reference being made from time to time to the accompanying drawing, forming part of the within disclosure, in which drawing:

FIG. 1 is a fragmentary perspective view of a motor vehicle body on which is mounted the device embodying the invention.

FIG. 2 is an enlarged bottom plan view of one of the carrier elements shown in FIG. 1, and showing one of the cross members received therein.

FIG. 3 is a side elevation of the device shown in FIG. 2, with the contour of the car roof illustrated in broken lines.

FIG. 4 is a right end elevational view of the device shown in FIG. 3.

Referring now more particularly to the drawing it will be understood that in the embodiment herein disclosed, the reference character 7 indicates the roof of a motor vehicle on which is mounted the device embodying the invention.

The car top carrier, in general, consists of a plurality of load carrying elements 8, which are mounted on either side of the car top roof, and each pair of members 8 having secured thereto a cross member 9.

The cross members 9 may either be made of a hard wood or metal. If made of metal, I prefer to make the cross members 9 of aluminum tubing, having a substantially rectangular cross section.

Each carrier member 8 consists of a metal strap 8A, which is curved as shown in FIG. 3.

The lower end 10, of the member 8A, is preferably dipped in "neoprene," or rubber, so that it will not damage the finish on the vehicle.

The lower end 10, of the member 8A, rests in the rain gutter 11 of the vehicle, and distributes its weight throughout a substantial area of the gutter 11.

A hinge member, having leaves 12 and 13, and a pintle 14, is secured to the member 8A by means of welding, as at 15.

The leaf 13 of the hinge is free to rotate on the pintle 14, and has an inturned portion 16 which is intended to contact the underside of the rain gutter 11, to prevent the member 8A from being dislodged from the rain gutter 11. The inturned portion 16 is also preferably dipped in "neoprene," or cover with rubber.

Each of the elements 8A and 13 is drilled and threaded to receive wing headed screws 17, which when rotated to the right draw the members 13 and 8A into closely contacting relation with the rain gutter 11, so that the device may not be dislodged from the rain gutter 11.

The upper end of the member 8A is provided with a tunnel-like element 18, which is preferably secured to the member 8 by welding, or other suitable means.

The element 18 is intended to receive the end of one of the cross members 9. The members 9 are secured in the members 18, by means of drilling the members, and extending therethrough bolts 19, which are provided with nuts 20 on the underside of the member 8A, FIG. 3. The cross members 9 are cut to the proper length to accommodate the particular size vehicle being used.

It will be noted that the members 8A are normally in spaced relation to the roof 7 of the vehicle, and remain that way during normal use, so that there is no wear or abrasion to the metal comprising the car roof. Nevertheless, I prefer to provide a plurality of rubber bumpers, or stops 21, which are preferably cemented to the inside of the members 8A, and serve to prevent damage to the car top 7, in the event of an overload on the carrier.

It is believed that the operation of the device is obvious from the foregoing description.

Having described my invention, what I claim and desire to secure by Letters Patent is:

1. In a carrier for a car top having a rain gutter, the combination of an arcuate resilient metal strap, means to secure said strap to a cross member, said strap having its lower end received in and contacting the said gutter, there being a butt hinge member having its butt secured by welding to the lower end to said metal strap, the movable leaf of said hinge member having an inturned element received under said rain gutter and threaded means to secure said movable leaf to said metal strap.

2. The structure of claim 1, in which said metal strap is normally spaced from the car top proper and is provided with resilient elements along said spaced portion.

3. The structure of claim 1, in which said last named means include a pair of winged studs, which extend through said leaf, and engage threaded bores formed in said strap.

References Cited by the Examiner

UNITED STATES PATENTS

| | | | |
|---|---|---|---|
| 2,940,652 | 6/1960 | Willard | 224—42.1 |
| 3,064,841 | 11/1962 | Ellingson | 224—42.1 |

FOREIGN PATENTS

| | | |
|---|---|---|
| 90,595 | 3/1961 | Denmark. |
| 1,133,051 | 11/1956 | France. |
| 516,334 | 2/1955 | Italy. |
| 100,778 | 10/1962 | Norway. |

GERALD M. FORLENZA, *Primary Examiner.*

J. E. OLDS, *Assistant Examiner.*